United States Patent [19] [11] 3,922,818
Carpenter et al. [45] Dec. 2, 1975

[54] METHOD AND APPARATUS FOR STRIPPING INSULATION FROM ELECTRICAL CONDUCTORS

[75] Inventors: Louis M. Carpenter; Kenneth L. Dunn, both of Fayetteville, N.Y.

[73] Assignee: Carpenter Mfg. Co. Inc., Manlius, N.Y.

[22] Filed: July 22, 1974

[21] Appl. No.: 490,738

[52] U.S. Cl. ................................ 51/40; 51/281 R
[51] Int. Cl.² ...................... B24B 1/00; B24B 19/00
[58] Field of Search ........ 51/40, 41, 42, 87 R, 80 R, 51/DIG. 10, 281 R

[56] References Cited
UNITED STATES PATENTS
2,693,056  11/1954  Gagne ...................................... 51/40
3,095,768  7/1963  Walstrom ............................ 51/87 X
3,385,140  5/1968  Carpenter ........................... 51/80 X
3,694,843  10/1972  Seifert ................................. 51/40 X

*Primary Examiner*—Donald G. Kelly
*Attorney, Agent, or Firm*—Charles S. McGuire

[57]  ABSTRACT

A method and apparatus for stripping insulation from an elongated electrical cable, or the like, by the action of spaced, rotating abrading wheels which are mounted for movement along guides in a direction transverse to the axis of the conductor, which is stationary during the stripping operation.

7 Claims, 12 Drawing Figures

3,922,818

METHOD AND APPARATUS FOR STRIPPING INSULATION FROM ELECTRICAL CONDUCTORS

The present invention relates to electrical insulation stripping and, more particularly, to novel methods and apparatus for removing insulation from selected portions of an electrical cable.

Many forms of apparatus have been devised for removing an outer covering of insulating material from electrical wires or cables to permit connection thereof to other wires, terminals, etc., in conducting contact therewith. These include, for example, various knives and other such implements for removing insulation by cutting, as well as rotating wheels or disks for abrading or stripping away the insulation. Such wheels are commonly made of, or include on the insulation-contacting surface, a material such as Fiberglas, abrasive cloth or stiff wire-ends (i.e., a circular "wire brush"). The electrical cable may be placed between a pair of such wheels which act to effectively strip away the insulation in the area of contact.

Prior art stripping apparatus of the rotating wheels type includes both portable, hand-held devices and table or bench model units. The latter are more or less permanently mounted and the portion of the cable to be stripped is moved between the rotating wheels, either axially if an end portion is to be stripped, or laterally when stripping an intermediate portion. In any case, the wheels are mounted for rotary motion only and the cable is moved more or less linearly with respect to the wheels to effect stripping.

It is a principal object of the present invention to provide novel methods and apparatus for stripping insulation from an electrical conductor by rotating stripping wheels wherein the cable is held stationary during stripping.

A further object is to provide apparatus having a pair of spaced, rotary, stripping wheels, positionally adjustable either in combination or with respect to one another, and mounted for common translatory movement to permit stripping insulation from a stationary conductor.

Other objects will in part be obvious and will in part appear hereinafter.

SUMMARY OF THE INVENTION

In accordance with the foregoing objects, the apparatus of the invention includes a pair of insulation stripping wheels of known construction mounted for rotation about parallel axes. An electric motor provides rotation of both wheels, preferably in the same direction, as disclosed in U.S. Pat. No, 3,385,140, through a system of belts and pulleys. A linear guide, against which one edge of the cable to be stripped is held, is provided on the apparatus.

The wheels are mounted on spaced arms extending from a support which is attached to a base. The motor is also attached to the base, the latter being reciprocally movable along linear guideways in a direction transverse to a conductor held on the aforementioned linear guide. The peripheries of the two wheels are spaced to form a gap substantially equal to the thickness of the conductor within the insulation to be stripped therefrom. The width of this gas is adjustable by movement about a pivotal mounting of the arm upon which one of the wheels is mounted. Also, the support for the two arms is pivotally mounted to provide common vertical adjustment of the wheel axes.

DETAILED DESCRIPTION

Figure 1:
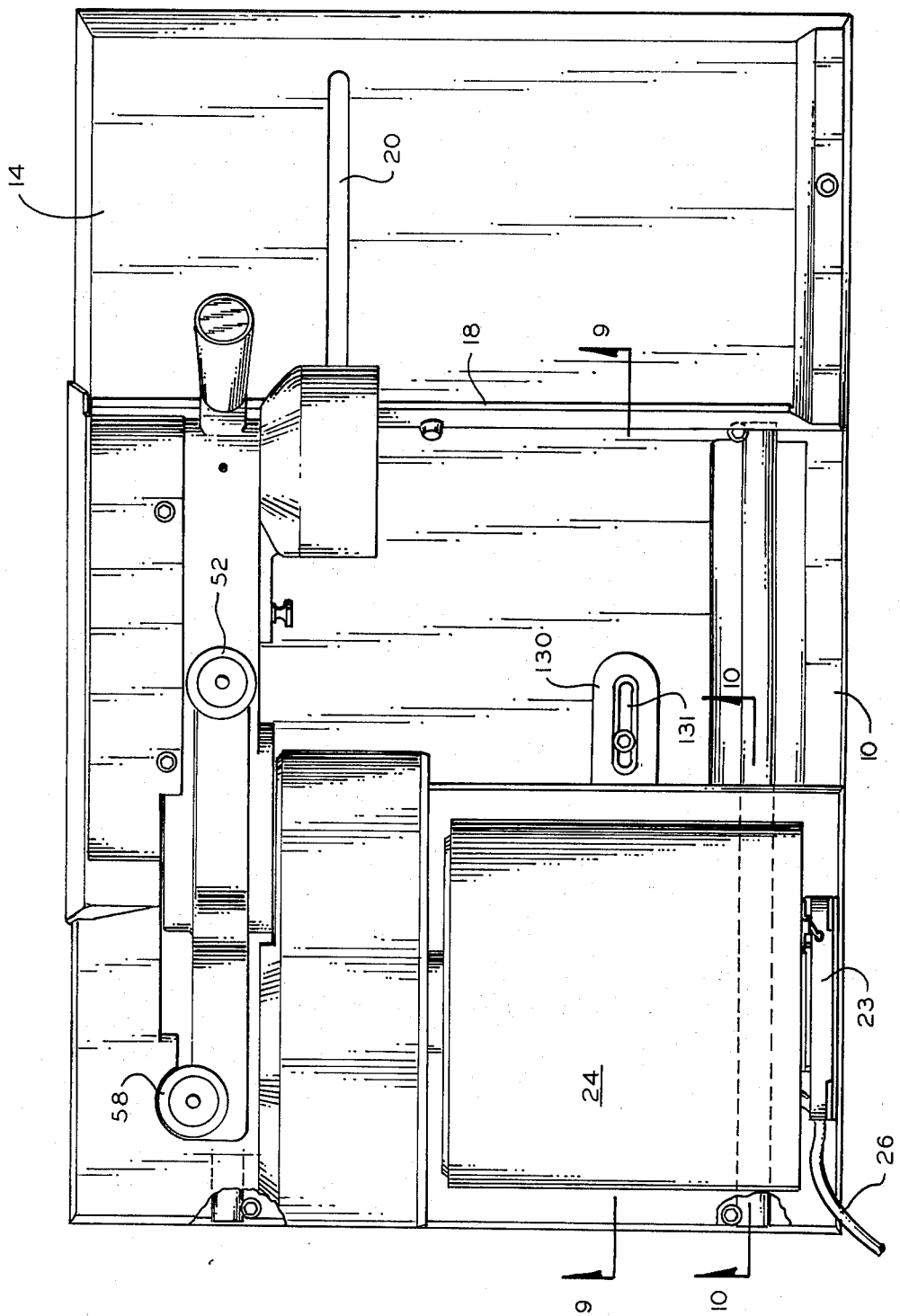
FIG. 1 is a top plan view of fully assembled apparatus embodying a preferred form of the invention.

Referring now to the drawings, the apparatus includes a stationary base place 10 which may be secured to a supporting table or bench surface, or rest upon pads 12, fixedly attached to plate 10. Horizontally disposed support plate 14 is also fixedly attached to and elevated from base plate 10 by support structure 16. Lip 18 is provided along one edge of support plate 14 and slot 20 extends through and laterally across the support plate from the edge at which lip 18 is attached.

Figure 2:
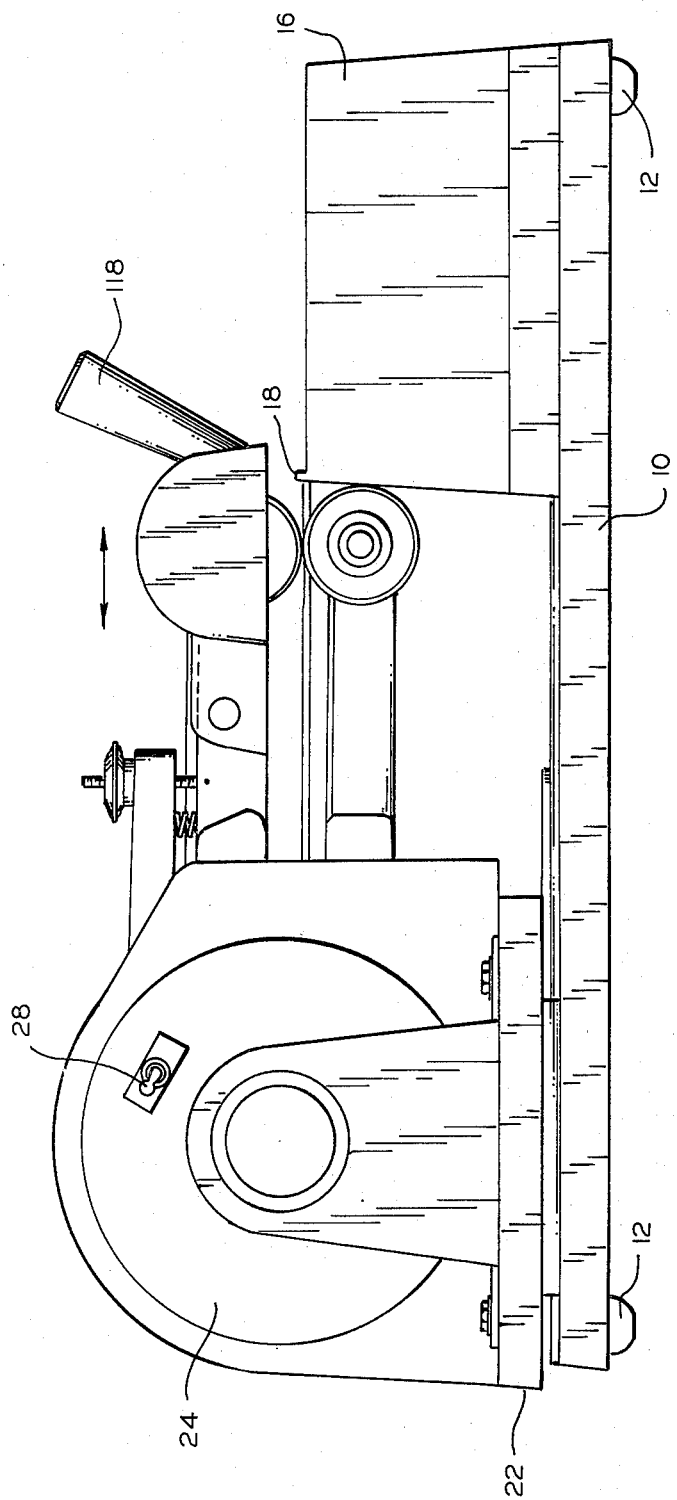
FIG. 2 and 3 are elevational views of opposite sides of the apparatus of FIG. 1.
Figure 3:
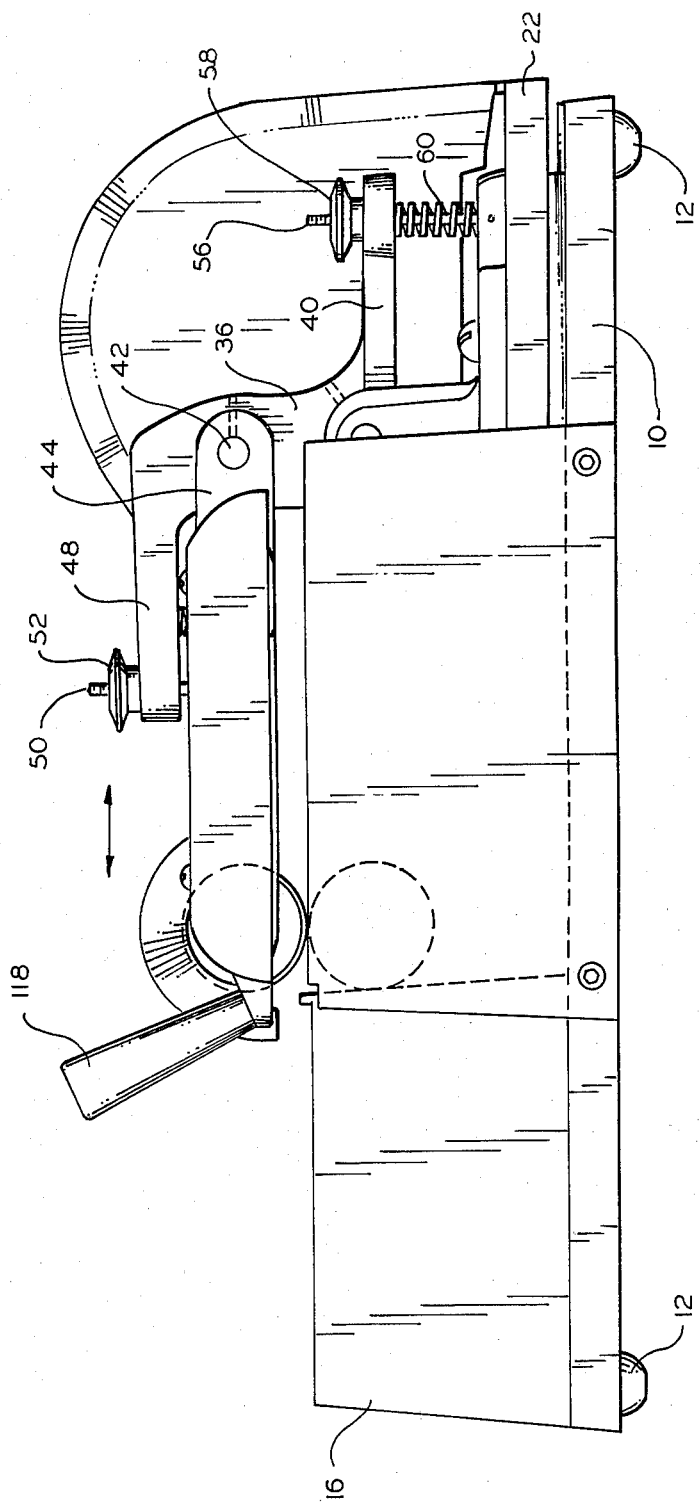
Figure 7:
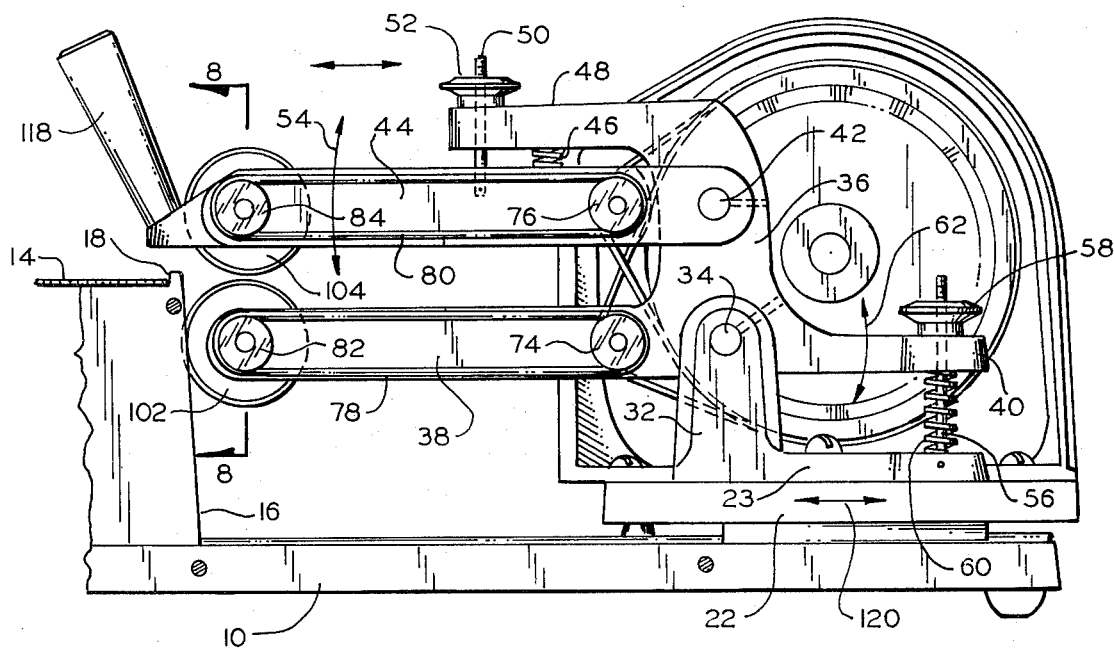
FIG. 7 is a fragmentary, side elevational view of the side shown in FIG. 3 with portions removed to illustrate more clearly positional relationships and operation of certain elements.

Movable base 22 is supported for reciprocating, linear movement with respect to base plate 10, as described more fully later herein. Fixedly mounted upon base 22 is casting 23 which supports one end of electric motor 24, having cord 26, a fragment of which is shown in FIG. 1, for attachment to an electrical power source in the usual manner, with toggle switch 28 (FIG. 2) providing on-off control for motor operation. Also fixedly mounted on movable base 22 is support 30, having upstanding portion 32. Shaft 34 extends laterally from upstanding portion 32 to provide pivotal mounting with respect thereto of element 36, having integral arms 38 and 40 extending forwardly and rearwardly, respectively, from the pivotally mounted portion of element 36, all as best seen in FIG. 7.

Pivotally attached at 42 to element 36 is adjustable arm 44, extending generally parallel to arm 38. Arm 44 is biased toward rotation in a clockwise direction, as shown in FIG. 7, about pivotal mounting 42 by tension spring 46, connected between arm 44 and upper extension 48 of element 36. Threaded rod 50 extends through a threaded opening in upper extension 48 to provide, with circular nut 52, an adjustable stop for arm 44. That is, arm 44 is biased by spring 46 against the lower end of rod 50, the position of which may be selectively varied by threading the rod a greater or lesser extent through the threaded opening in extension 48. Thus, arm 44 may be adjustably positioned with respect to extension 48, and the elements to which it is connected, in the directions indicated by arrows 54.

Extending upwardly from a fixed attachment to movable base 22 is rod 56, having circular nut 58 threaded thereon. Rod 56 extends loosely through an opening in arm 40 which is biased firmly against nut 58 by compression spring 60. Element 36 may be selectively adjusted about its pivotal mounting on shaft 34 as indicated by arrows 62, by movement of nut 58 up or down on rod 56. Thus, both arms 38 and 44 may be cooperatively moved about a horizontal axis.

Drive shaft 64 of motor 24 imparts rotation to double-grooved pulley 66, carrying belts 68 and 70. Protective cover 72 is normally disposed around the otherwise accessible portions of pulley 66, being removed in FIG. 6 for a clearer showing of these elements. Belt 68 also is frictionally engaged in a groove of pulley 74 which is rotatably mounted on suitable bearings in arm 38, extending through the arm and having a similar belt groove at the opposite end. Belt 70 is carried in a groove of pulley 76, extending rotatably through arm 44 and having a similar belt groove on the opposite side of the arm.

Figure 8:
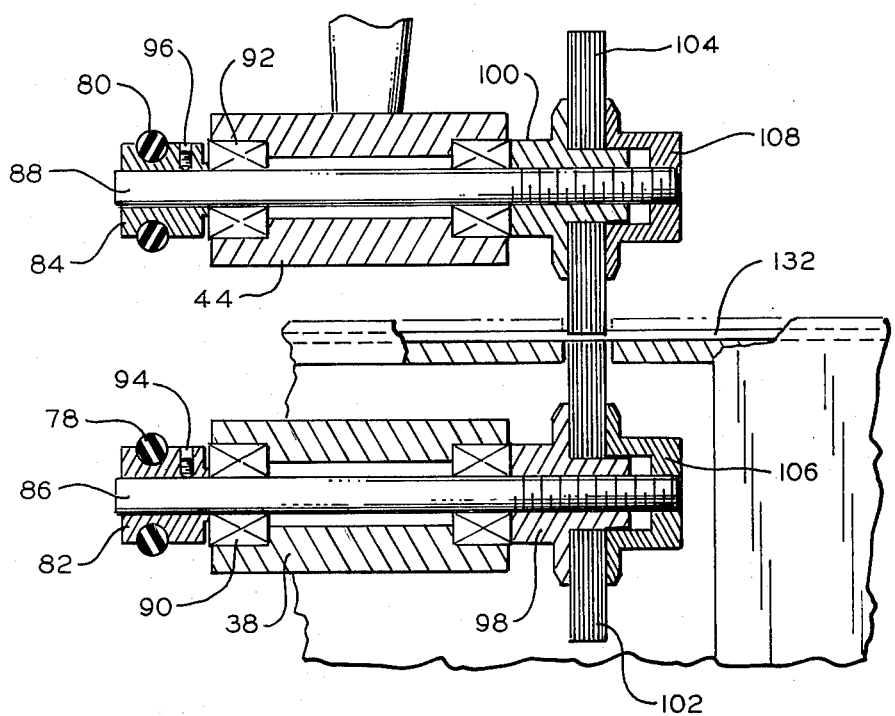
FIG. 8 is a fragmentary, sectional view taken generally on lines 8—8 of FIGS. 6 and 7.

Belts 78 and 80 are carried in the grooves of pulleys 74 and 76, respectively, and in similar grooves in pulleys 82 and 84, each rotatably mounted adjacent the ends of arms 38 and 44, respectively, remote from pulleys 74 and 76. Thus, rotation is imparted from pulley 66 through belts 68 and 70 to pulleys 74 and 76, and thence through belts 78 and 80 to pulleys 82 and 84, respectively. As shown in FIG. 8, pulleys 82 and 84 are attached to shafts 86 and 88 which extend through bearings diagrammatically indicated at 90 and 92. Set screws 94 and 96 hold pulleys 82 and 84 firmly to shafts 86 and 88, respectively, and an identical arrangement may be employed for pulleys 74 and 76. That is, pulleys 74 and 76 preferably each comprise two separate pulleys on opposite sides of arms 38 and 44, affixed by set screws to shafts extending through bearings in the two arms.

The ends of shafts 86 and 88 opposite pulleys 82 and 84 are threaded to receive bushings 98 and 100, upon which abrasive wheels 102 and 104, respectively are press fitted, together with caps 106 and 108. Thus, rotation from motor 24 is imparted through the aforedescribed pulleys and belts to shafts 86 and 88, and to the respective abrasive wheels carried thereby. Wheels 102 and 104 are of known construction, at least the peripheral surfaces thereof being of a material which will strip away the usual types of insulating materials for electrical wires when the wheels are rotated at relatively high speeds with such surfaces in contact with the insulation. Common examples of rotating wheels used in applications of this type are those having peripheral surfaces of Fiberglas, and those constructed in the nature of wire brushes. Wheels 102 and 104 may be rotated in the same direction, as in the illustrated embodiment, or in opposite directions. It will be observed that when the two wheels are rotated in the same direction the upper peripheral surface of wheels 102 is moving in the opposite direction from the lower peripheral surface of wheel 104, whereby the tangential forces exerted by the wheels on a material positioned threbetween and contacted by each tend to neutralize one another.

Figure 4:
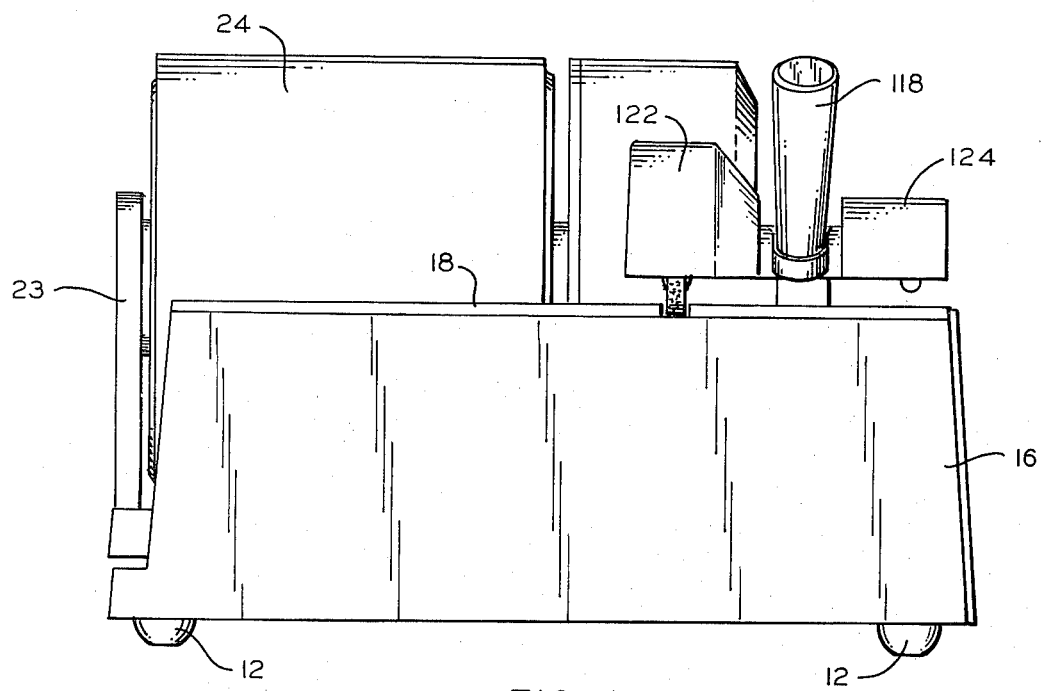
FIGS. 4 and 5 are front and rear elevational views, respectively, of the same apparatus.
Figure 5:
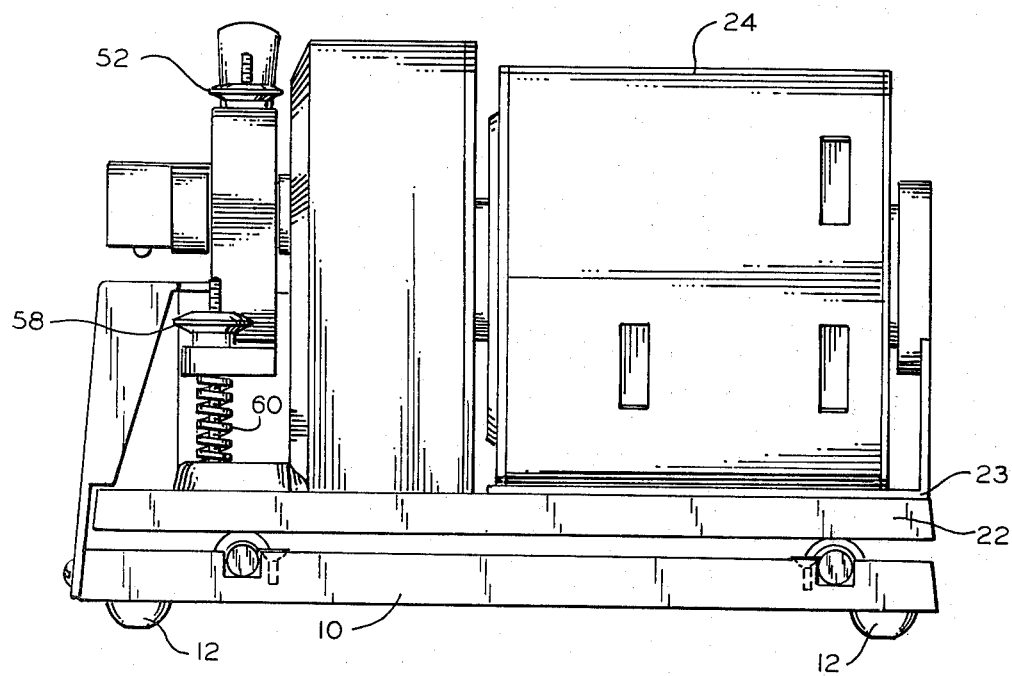
Figure 9:
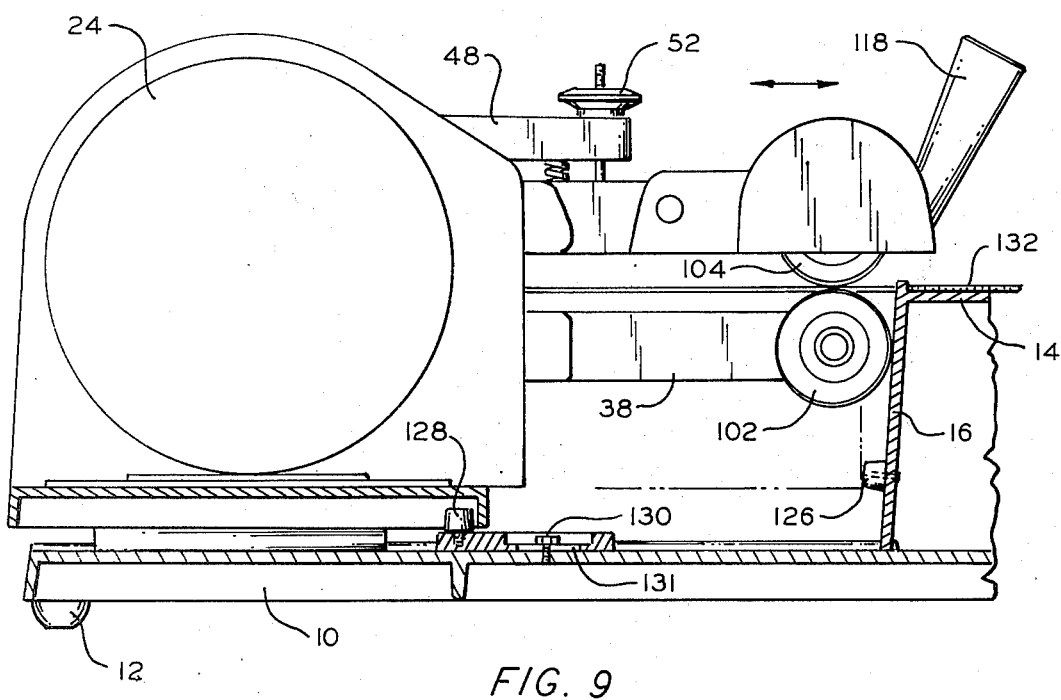
FIG. 9 is a fragmentary, sectional view taken on the lines 9—9 of FIG. 1.
Figure 10:
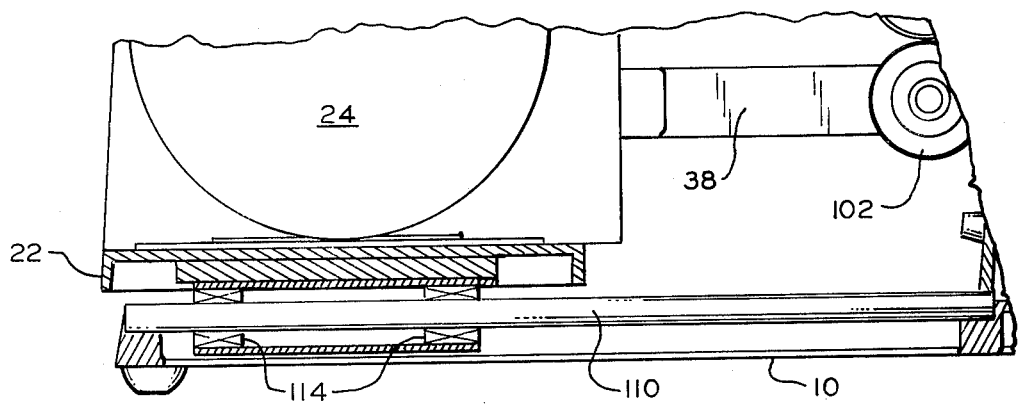
FIGS. 10 and 11 are fragmentary, sectional view of the lower portion only of the apparatus, taken on the lines 10—10 and 11—11, respectively, of FIG. 1.
Figure 11:
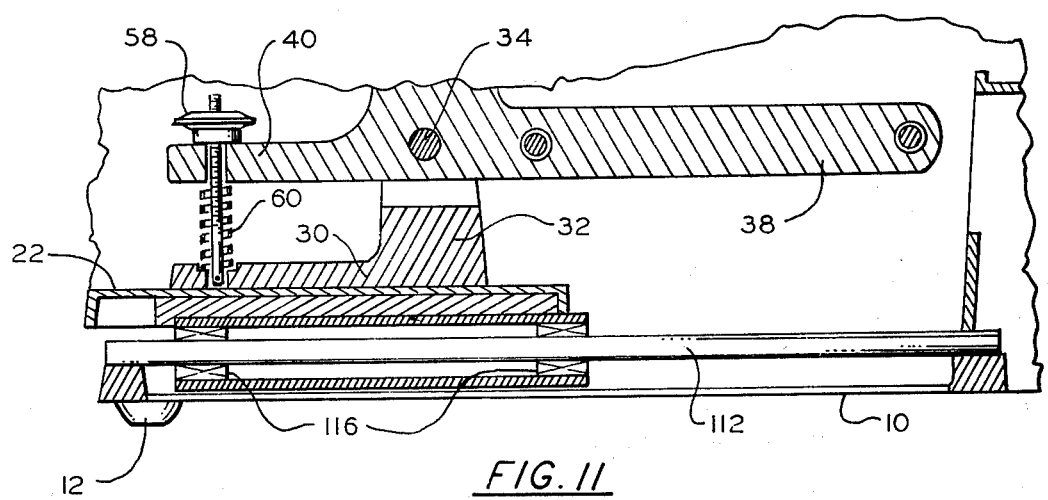

A pair of fixed, linear guideways in the form of rods 110 and 112 are mounted on base plate 10. Movable base 22 carries bearing 114 and 116 (FIGS. 10 and 11) which operatively engage rods 110 and 112, respectively, to provide reciprocal, linear movement of base 22 with respect to base 10. Manually engageable handle 118 is affixed to arm 44, whereby base 22 may be selectively moved back and forth in the directions indicated by arrows 120. As seen in FIG. 4, handle 118 is affixed to arm 44 between protective covers 122 and 124, which are removed in FIGS. 6 and 7. Travel of movable base 22 is limited in one direction by contact with fixed stop 126 on support structure 16, and in the other direction by adjustable stop 128 (FIG. 9). The latter is secured to fixed base 10 by screw 130 extending through slot 131 to provide limited positional adjustment in the direction of travel of base 22.

Figure 12:
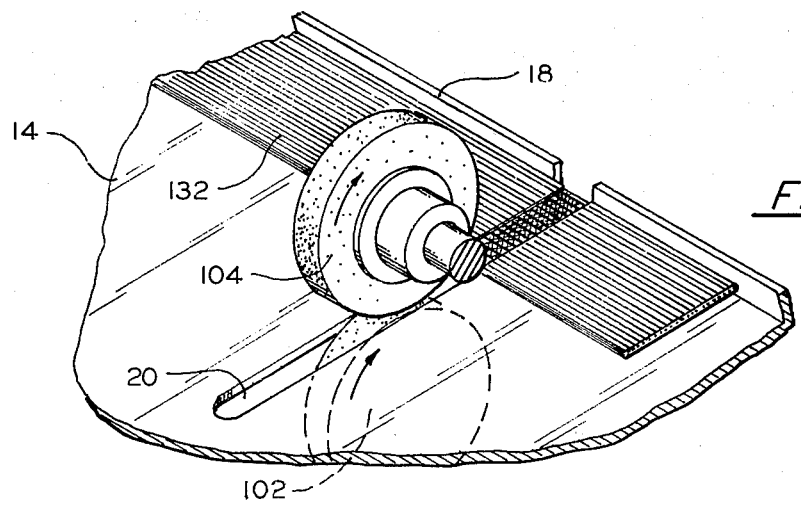
FIG. 12 is a fragmentary, perspective view showing more clearly the actual stripping operation.

Although the apparatus of the invention may be used for stripping single strand cable, it is especially advantageous in stripping medial portions of flat cable wherein a plurality of conductors are arranged side-by-side and each covered by a continuous layer of insulation. An example of such cable is shown in FIGS. 8, 9 and 12 and indicated by reference numeral 132. The diameter or thickness of the conductors within cable 132 is known in advance for any particular cable to be stripped. The gap or space between opposing peripheral surfaces of wheels 102 and 104 is set to this dimension by adjustment of nut 52. The plane of the centerline between the peripheral surfaces is adjusted to coincide with the horizontal centerline of the conductors, with cable 132 placed upon support plate 14 with one edge against lip 18, by adjustment of nut 58.

Figure 6:
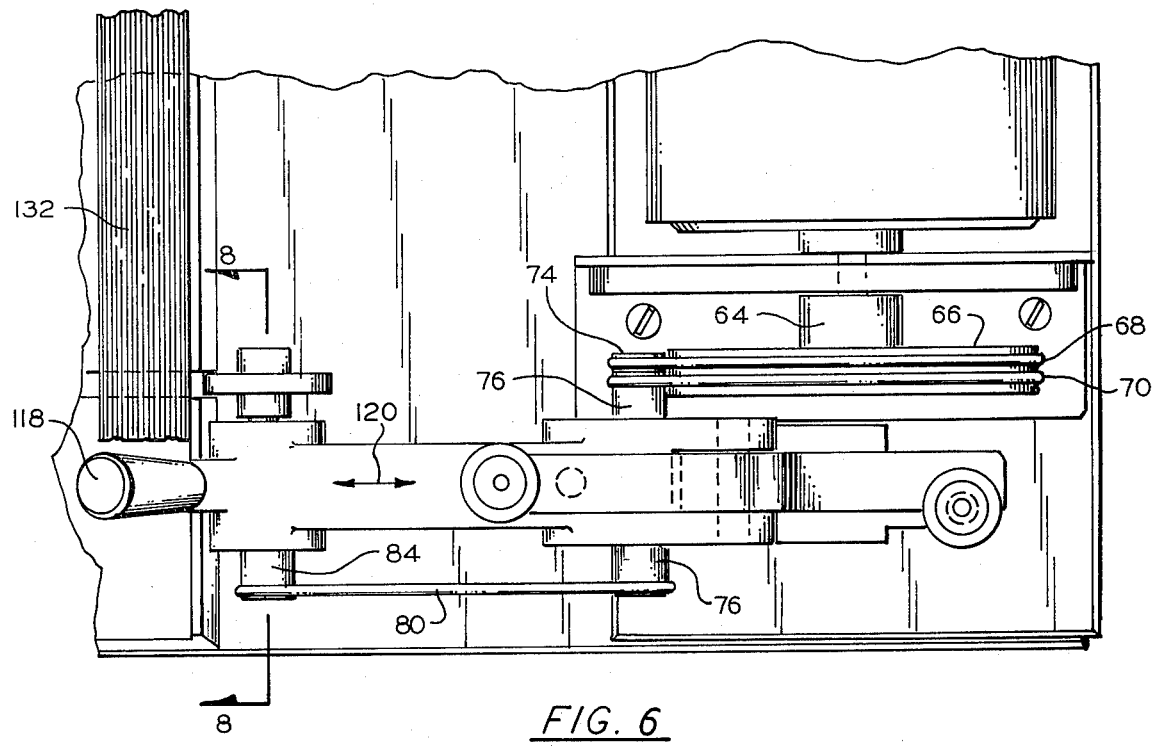
FIG. 6 is a fragmentary, top plan view of the apparatus with certain portions removed.

The portion of cable 132 to be stripped of insulation is aligned with slot 20. With motor 24 running to impart rotation to wheels 102 and 104, handle 118 is grasped and moved toward the left, as shown in FIGS. 6 and 7. Wheels 102 and 104 will thus be moved across the portion of cable 132 bridging slot 20, as the cable is held stationary, thereby stripping away all the insulation in a path as wide as the wheels. This action is best shown in FIG. 12. Movable base 22 is then returned to its original position while cable 132 remains stationary, thus making a pass of wheels 102 and 104 over cable 132 in both directions for each portion stripped. Cable 132 is then moved longitudinally by a distance equal to that desired for the unstripped portion, and movement of the stripping wheels is repeated.

From the foregoing description it may be seen that the present invention provides an accurate and expedient means for stripping insulation from electrical cables, particularly those of the flat wire type. The cable may be held firmly in position as it is stripped. Since the only movement of the cable is in a longitudinal direction, essentially continuous lengths may be handled being fed from a supply to a take-up roll, for example. This and other constructional features make the invention especially suitable for automated operation, although the disclosed embodiment is manually operated. Accurate adjustment of the gap between the stripping wheels and of the centerline position thereof, insures that the individual conductors will not be marred or distorted during stripping. Suitable calibrating indicia may be provided, if desired, for the wheel position adjustments.

We claim:
1. Apparatus for stripping insulation from an elongated electrical cable comprising, in combination:
   a. a first support member;
   b. a fixed base upon which said first support member is mounted for reciprocal, linear movement;

c. a second support member pivotally attached to said first support member for movement relative thereto about a first horizontal axis;

d. a first arm formed integrally with and extending forwardly from the pivotal connection of said second to said first support member;

e. a second arm pivotally attached to said second support member for movement relative thereto about a second horizontal axis, parallel to said first axis, and extending generally parallel to said first arm;

f. a pair of stripper wheels respectively mounted at the forward ends of said arms for rotation about spaced, parallel, third horizontal axes, perpendicular to said first and second axes;

g. a workpiece support having a horizontally disposed surface fixed with respect to said base and having a cut-out area for passage of said stripping wheels upon movement of said first support member relative thereto; and h. means for imparting rotation to said stripper wheels.

2. The invention according to claim 1 wherein said second support member includes an integral third arm, extending rearwardly from the pivotal connection of said second to said first support member, and means associated with said third arm for selectively adjusting the position of said second support member about said first axis.

3. The invention according to claim 1 wherein said second support member includes an upper portion extending above said second arm and means associated with said upper portion for selectively adjusting the position of said second arm about said second axis.

4. A method of stripping insulation from an elongated electrical cable having one or more conductors of known thickness covered by a continuous layer of insulating material, by means of an electrically powered stripping machine, said method comprising:

a. arranging said cable to extend in a first direction and through vertical planes on both sides of the machine;

b. mounting a pair of stripper wheels having outer peripheral surfaces of abrasive material with said surfaces in spaced relation to define a predetermined gap corresponding substantially to said known thickness;

c. rotating said stripper wheels; and d. holding said cable stationary while moving said wheels together in a linear direction transverse to said first direction with said conductor positioned within said gap.

5. The invention according to claim 4 wherein said wheels are rotated in the same direction, whereby opposing portions of said peripheral surfaces on opposite sides of said gap are moving in opposite directions.

6. The invention according to claim 4 wherein the portion of said cable across which said wheels are moved to strip insulation is intermediate of the ends of said cable.

7. The invention according to claim 6 wherein said cable is a flat type cable wherein a plurality of conductors are arranged in side-by-side, spaced relation, and said cable is held with the flat sides parallel to the planes of movement of said peripheral surfaces.

\* \* \* \* \*